July 6, 1943.  E. W. KRUEGER  2,323,546
RING FORMING MACHINE
Filed Aug. 12, 1942
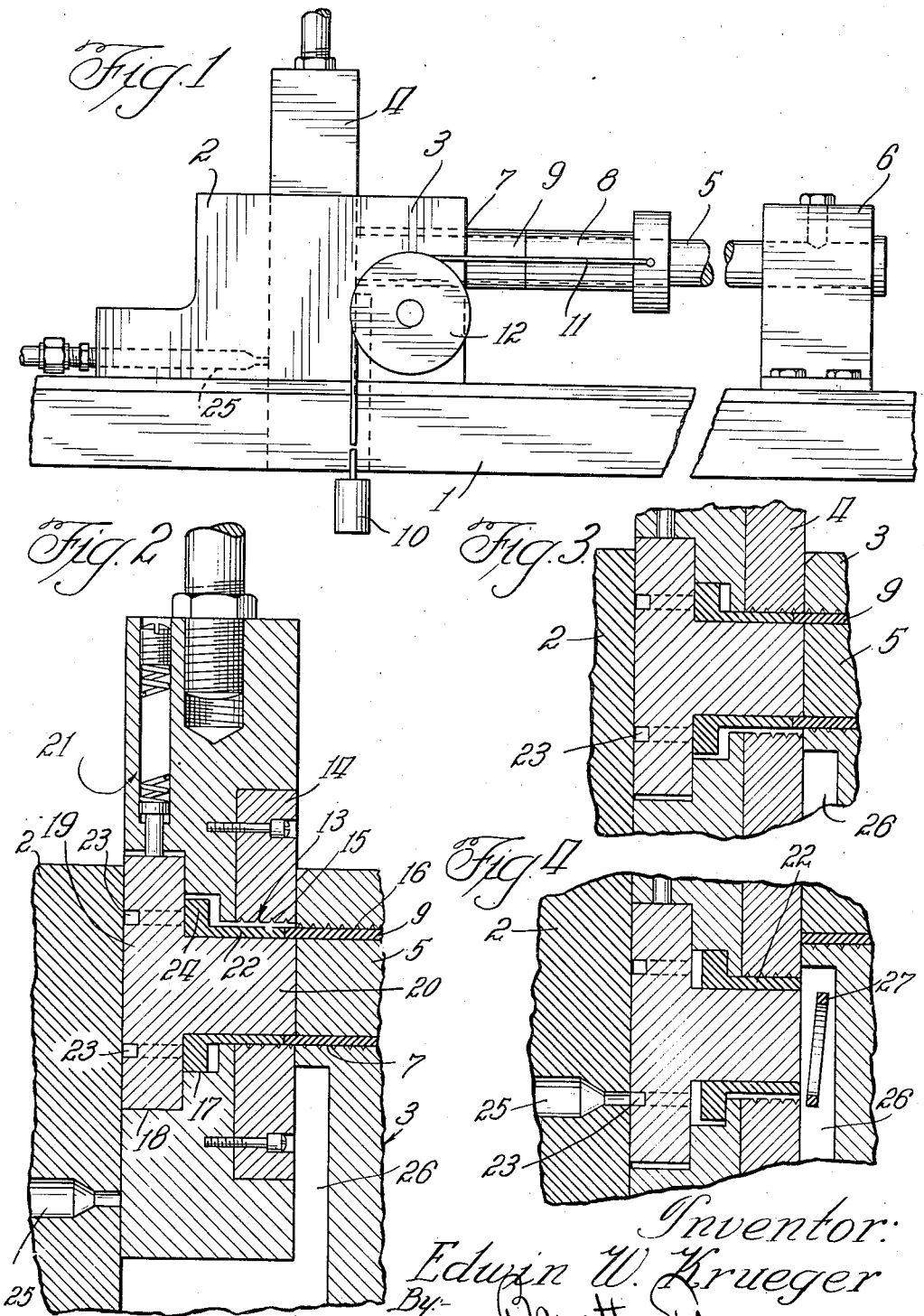
Inventor:
Edwin W. Krueger
By- Barnett & Numan Attys.

Patented July 6, 1943

2,323,546

UNITED STATES PATENT OFFICE 2,323,546

RING FORMING MACHINE

Edwin W. Krueger, River Forest, Ill.

Application August 12, 1942, Serial No. 454,605

6 Claims. (Cl. 164—48)

This invention is directed to new and useful improvements in ring forming machine and is particularly directed to such a machine that successively shears rings of determined thickness from a length of tubing fed to the machine.

It is broadly old to provide a machine in which the tubing stock is fed over a mandrel to a movable shearing member which moves downwardly to shear a portion of the tube to form a ring.

It has been found, however, that rings thus formed are frequently deformed by the shearing action so that they are not usable where accurately shaped rings are needed.

It is the primary object of this invention to provide such a machine in which the movable shearing member is so constructed that such deformation of the rings will not occur.

Another object of this invention is to provide in such a machine a stationary block through which the tube stock is fed to the shearing member so constructed that the tube is gripped during the shearing action so as to prevent "crawling" or displacement and to promote accuracy and eliminate burrs.

Still another object is to provide a shearing member so constructed that the portion of the tube to be sheared from the body of the tube is gripped by the movable shearing member in such a manner that a symmetrically formed ring is sheared from the tube stock.

Other advantages and objects of this invention will be apparent from the following detailed description.

In the drawing:

Fig. 1 is a side elevation of such a machine embodying this invention.

Fig. 2 is an enlarged detailed cross-section view of the movable or shearing member showing its position immediately prior to shearing the ring from the tubing.

Fig. 3 is a view similar to Fig. 2 but showing the position of the movable shearing member shortly after starting its downward movement.

Fig. 4 is another detailed view of the shearing member showing its position at the bottom of its stroke with the sheared ring being ejected from the machine.

In detail, 1 is the base of the machine, 2 is a backing block and 3 is the feed block spaced from block 2. Between these two blocks is positioned the vertically movable shearing block 4 adapted to be moved downwardly with great force. A mandrel 5 is supported in horizontal position by a support 6 secured to base 1 and mandrel 5 extends into the cylindrical opening 7 in feed block 3. The diameter of mandrel 5 is that of the inner diameter of the tubing from which the rings are to be sheared, with sufficient tolerance so that the tubing may be slidably fitted around the mandrel. The cylindrical opening 7 is of a diameter substantially that of the outer diameter of the tube with a similar tolerance so that the tube may be readily moved over the mandrel and within the block 3 but held without substantial play.

A feeding sleeve 8 is positioned around mandrel 5 and is of substantially the same inner and outer diameter as the tubing stock from which the rings are to be sheared. Such tubing is shown clearly in Fig. 1 and is indicated by 9.

The feeding sleeve 8 is urged in a direction toward the shearing block 4 by means of a weight 10 secured to the end of the sleeve member 8 by means of a cable 11 which passes over pulley 12.

It can be seen that the feed end of sleeve 8 abuts against the tubing 9 and because of the weight 10 forces it in a direction towards shearing block 4.

Shearing block 4 is provided with a vertically elongated substantially circular opening 13 the lower part of which aligns itself with the lower part of opening 7 in the feed block 3 when shearing block 4 is in its uppermost position. Adjacent the shearing face of block 4 this opening is formed by a removable block 14 provided with such an opening that aligns with the block opening. The inner, substantially circular surface of this block is provided with gripping grooves or threads 15, about 112 per inch, similar to a 60° V-thread, but the size and number of these grooves may be varied.

Similar grooves are provided in the inner curved surface of opening 7 in the feed block 3 as at 16.

It will be seen from Fig. 2 that the elongated circular opening forms, in fact, a vertical slot with circular ends and that the length of this slot is slightly greater than the diameter of the cylindrical opening 7 in the feed block 3.

This opening in block 4 is progressively enlarged as at 17 and 18 and there is positioned in these openings a floating horn member 19 which is of less vertical height than the vertical dimension of the openings 17 and 18 but of substantially the same horizontal dimensions so that it may be moved vertically within the block but in no other direction.

This horn member 19 is formed with a cylindrical thimble portion 20 of substantially the same diameter as mandrel 5 and is adapted to align itself with mandrel 5 when shear block 4 is in top position. A spring assembly 21 holds member 19 against the lower surfaces of openings 13, 17 and 18, as shown in Fig. 2, to form with opening 13, a tube receiving pocket.

A discharge sleeve member 22 is slidably fitted around cylindrical portion 20 and air openings 23 lead to enlarged stop portions 24 of ejector sleeve 22. The clearance provided by the differences in vertical dimensions of the floating member 19 and the openings in the shear block is about 0.04".

Floating member 19 is held in its operative position by backing block 2, which is provided with air passageway 25 connected to some source of compressed air and with which the air openings 23 will align when the shear block is at its lowest position.

The lower part of feed block 3 is provided with a ring discharge passageway 26.

In operation the shear block is in position shown in Fig. 2. The feeding sleeve 8 moves the tube 9 towards shear block 4 through feed block 3 and into shear block 4 around the floating cylindrical thimble portion 20 and abutting against the ends of ejector sleeve 22.

Shear block 4 is then started in its downward movement by some means not shown but it is well known that a force of, for example, about seventy to eighty tons will effect the shearing action of 1" diameter copper tubing. However the floating horn member 19 does not move with the block as it starts down because the end of the tube 9 surrounding the thimble portion holds it in initial position.

But as the shear block descends further the upper part of the shear block opening engages the upper surfaces of the floating member and the upper face of the protruding end of the tube so that the upper part of the tube becomes gripped between the gripping grooves of block 14 and the upper portion of thimble member 20 as shown in Fig. 3.

As the shear block continues downwardly the gripping grooves in block 3 engage and hold tube 9 to prevent the metal attempting to evade the shearing action at lower part of tube.

The combination of the gripping action provided by the floating horn member and the gripping grooves 15 and 16 so holds the tube stock that a clean, undistorted ring is produced.

The shear block continues down and the portion of tube 9 that has extended into the shear block is neatly sheared off without distortion in the form of a ring 27.

At the bottom of the stroke, air passageways 23 and 25 become aligned and by suitable cam action compressed air is admitted to move the ejector 22 so as to discharge the ring 27 as shown in Fig. 4.

The shear block then returns to original position and the tube is again forced into shearing position, pushing the ejector 22 back into position and the action is repeated.

I claim:

1. In a ring shearing machine comprising a tube supporting mandrel, a feed block and a movable shearing member adapted to shear the protruding end of the tube stock mounted on the supporting mandrel, the improvement that comprises a floating horn member positioned and vertically movable in the shearing member, yielding means for normally holding said horn in its lowermost position with relation to the shearing edge of the shearing member so as to provide a clearance therebetween, said horn having a tube receiving thimble portion of similar diameter to that of the mandrel, arranged to be aligned with the mandrel to receive an end of the tube stock when the shearing member is in its uppermost position, said shearing member provided with a vertically elongated shearing opening having a shearing edge, within which opening the thimble is positioned, said shearing edge clearing the upper surface of the tube to be sheared when in its uppermost position, and being movable in the direction of the long axis of the elongated opening therein whereby the shearing member may descend until the clearance between the sharing edge and the upper portion of the tube stock is closed and the tube to be sheared is firmly gripped between the thimble and the shearing edge preceding and during the shearing action.

2. In a machine for shearing rings from tubes, comprising a feed mandrel, support block, and movable shearing block, the improvement that comprises such a movable shear block provided with a tube receiving opening of greater length in one direction than the diameter of the tube to be sheared, a tube receiving thimble of similar size to the inside diameter of the tube to be sheared positioned within the shear block and movable therein in a direction of the greatest length of the tube receiving opening, spring means normally holding the thimble portion in tube receiving position with clearance to permit feeding of an end of the tube over the thimble, said thimble adapted to be aligned with the mandrel in receiving position and to maintain this position during the initial period of the shearing stroke until the upper part of the tube receiving opening of the shear block comes in contact with and grips the tube to be sheared whereby the tube is positively gripped between the thimble and said part of the tube receiving portion and is so held before and while the ring is sheared from the tube and all parts are returned to their original positions upon the completion of the back stroke of the shearing mechanism.

3. A ring forming machine comprising a feed mandrel for the tube from which the rings are to be formed, a feeding block within which the mandrel is positioned and centered, a movable shearing block positioned against the feed block, said shear block being provided with an elongated tube receiving opening of a width substantially equal to the diameter of the tube from which the rings are to be sheared and of a height greater than such diameter, a cylindrical tube receiving thimble of substantially the same diameter as the inner diameter of the tube, vertically movable within said elongated opening and adapted to be aligned with the mandrel for receiving the tube, and means for moving the shear member in the direction of said elongation whereby all clearance between the shear member and the upper portion of the tube is closed and the portion of the tube extending around the thimble is gripped between the thimble and shear member preceding and during the shearing stroke.

4. A ring forming machine comprising a feed mandrel for the tube from which the rings are to be formed, a feeding block within which the mandrel is positioned and centered, a movable shearing block positioned against the feed block, said shear block being provided with an elongated tube receiving opening of a width substantially equal to the diameter of the tube from which the rings are to be sheared, a cylindrical tube receiving thimble of substantially the same diameter as the inner diameter of the tube, vertically movable within said elongated opening and adapted to be aligned with the mandrel for receiving the tube, gripping grooves formed on the inner surfaces of the shearing member and feed block and means for moving the shear member in the direction of said elongation whereby all clearance between the shear member and the upper portion of the tube is closed and the tube is positively gripped by the shearing member preceding and during the shearing operation so as to prevent deformation of the formed ring.

5. In a machine for shearing rings from tubing stock, the improvement that comprises a movable shearing block provided with an elongated tube receiving opening of substantially the same width as the diameter of the tube stock the ends being curved with substantially the same radius as said stock, the length being greater than the diameter of the stock, a tube receiving thimble positioned within said opening and of substantially the same diameter as the inside diameter of said stock, shoulders on said thimble limiting the thickness of the rings to be formed, means permitting movement of said thimble within said opening in the direction of its length, and means for moving said shearing block in the direction of the length of the opening whereby all clearance between the shear member and the upper surface of the tube is closed and the tube stock within the opening becomes gripped by the shearing block assembly preceding and during the shearing action, and the parts are restored to their original positions by the return stroke of the shearing mechanism.

6. A ring forming machine comprising a feed mandrel for internally supporting the tube stock, a feeding block for externally supporting said stock and a movable shear member for shearing a ring from the stock, the improvement in the shearing block that comprises an elongated tube receiving opening in the block into which the tubing stock is moved for the shearing action, a thimble member adapted to receive and support one end of the tubing stock, said thimble member being movably supported within the tube receiving opening whereby there is sufficient clearance to permit of free feeding of a portion of the tube over said thimble and into the tube, and means whereby the shearing member is first moved to close said clearance and firmly grip the upper portion of said tube, and then to shear off the end of the tube while so firmly gripped.

EDWIN W. KRUEGER.